3,518,714
CASTER APPARATUS WITH SWIVEL
DAMPENING BRAKES
Clarence H. Hager, Rockford, Ill., assignor to Modern
Caster Co., Inc., Rockford, Ill., a corporation of Illinois
Filed Nov. 13, 1968, Ser. No. 775,323
Int. Cl. B60b 33/00
U.S. Cl. 16—35                                10 Claims

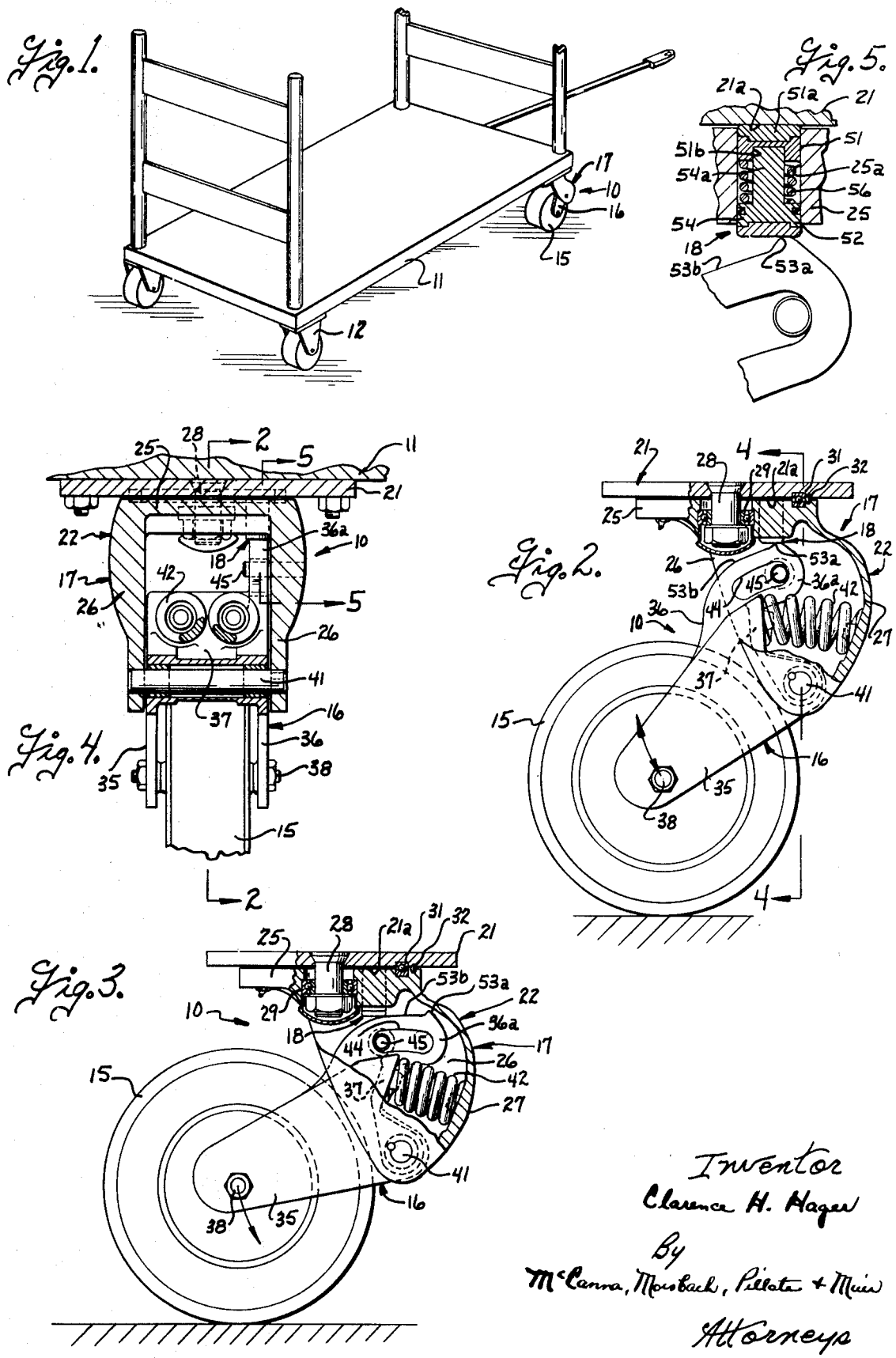
July 7, 1970     C. H. HAGER     3,518,714
CASTER APPARATUS WITH SWIVEL DAMPENING BRAKES
Filed Nov. 13, 1968
Inventor
Clarence H. Hager
By
McCanna, Morsbach, Pillote & Muir
Attorneys United States Patent Office 3,518,714
Patented July 7, 1970

ABSTRACT OF THE DISCLOSURE

A caster apparatus of the shock absorbing type having a caster bracket mounted for swiveling movement about an upright axis and a caster wheel yieldably mounted on the caster bracket for limited vertical movement, in which a swivel dampening brake is automatically operated in response to vertical movement of the wheel to increase the braking action when the wheel moves out of engagement with the ground to inhibit free swiveling of the caster wheel under these conditions.

---

It is common practice in many types of vehicles, particularly trailer-type vehicles used as factory trucks, baggage trucks, etc. to use one or more caster wheels on the vehicle to facilitate maneuvering around corners, turns and the like. The surface such as the roadway, floor or the like, hereinafter generally referred to as the ground, over which such vehicles are maneuvered is not always smooth and uniform and shock absorbing type casters such as shown in Pat. No. 2,738,542 have heretofore been used to accommodate some irregularity in the ground over which the vehicle moves. The amount of vertical movement in even the shock absorber type castings is, however, limited and situations are encountered when one or more of the caster wheels will move out of engagement with the ground as the vehicle is traveling. When the caster wheel moves out of engagement with the ground, it can turn or swivel about its swivel axis and will sometimes swing to a substantial angle relative to the path of travel of the vehicle. Under these conditions, the ground engaging wheel will not be in a position to roll properly when it thereafter contacts the ground and the caster is accordingly subjected to high lateral forces until the wheel again swings into proper trailing position. If the vehicle is under substantial load and/or is traveling at a relatively high speed, these forces have sometimes been sufficient to tear the caster wheel from its mounting on the vehicle.

It has heretofore been proposed to provide a dampening brake to inhibit swivel movement of a caster wheel. However, the prior dampening brake arrangements for caster wheels have been such that a constant braking action was applied under all operating conditions. If a constant braking action is made sufficient to prevent swiveling when the wheel is out of engagement with the ground, then it would also interfere with free swiveling of the casters during normal operation of the vehicle and caster unit.

An important object of this invention is to provide a swivel dampening brake for a caster unit which is effective to inhibit swiveling of the caster unit when the wheel moves out of engagement with the ground, but yet permits relatively free swiveling movement of the caster while the wheel is in its normal ground engaging position.

Another object of this invention is to provide a caster wheel having a swivel dampening brake having a means for automatically varying the braking action in accordance with the vertical position of the caster wheel.

A more particular object of this invention is to provide a caster of the shock absorbing type in which the caster wheel is yieldably supported for limited vertical movement with respect to its mounting with a swivel dampening brake automatically operated when the shock absorbing caster moves toward its lower limit of travel.

These, together with other objects and advantages of this invention, will be more readily understood by reference to the following detailed description when taken in connection with the accompanying drawing therein:

FIG. 1 is a perspective view of a vehicle employing casters constructed in accordance with the present invention;

FIGS. 2 and 3 are side elevational views of a caster unit constructed in accordance with the present invention, and with parts broken away along the line 2—2 of FIG. 4 and shown in section to illustrate details of construction.

FIG. 4 is a fragmentary sectional view through the caster unit taken on the plane 4—4 of FIG. 2; and FIG. 5 is a fragmentary sectional view on an enlarged scale taken on the plane 5—5 of FIG. 4 and illustrating the swivel dampening brake.

As shown in the drawings, the invention is embodied in a caster unit 10 which is adapted to be attached to a body such as a vehicle 11 to support the same. The number of the caster units used for each vehicle will vary in different installations and, in the form shown, in FIG. 1, two caster units are used at the trail end of the vehicle along with two fixed wheels 12 at the front end of the vehicle, it being understood that a greater or lesser number of caster units may be used in different installations.

The caster unit 10 in general includes one or more caster wheels 15, a wheel support bracket 16, a means 17 for mounting the caster wheel support bracket for swiveling movement about a generally upright axis, and a brake means 18 for dampening the swiveling movement of the caster wheel. In the embodiment illustrated, the mounting means 17 includes a mounting bracket 21 adapted for attachment in any suitable manner to the body 11 to be supported, and a caster bracket 22 which is swivelly attached to the mounting bracket. As best shown in FIGS. 2 and 3, the caster bracket 2 is in the form of a housing open at the rear side thereof and including a top wall 25, spaced side walls 26, and a rear wall 27 joined to the top and side walls of the housing. The top wall is herein shown mounted on the bracket 21 by a pivot pin 28 and bearing 29, preferably of the anti-friction type. In swivel mountings of the type shown wherein the length of the pivot pin 28 is relatively short, it is advantageous to also employ a large diameter anti-friction bearing assembly 31 between the caster bracket and the mounting bracket and spaced outwardly from the pivot pin 28 to provide a stable support. A dust seal 32 may conveniently be mounted in opposed grooves in the mounting bracket and caster bracket outwardly of the bearing 21.

The caster unit is of the shock absorbing type and the wheel support bracket 16 is yieldably supported for a limited vertical movement relative to the caster bracket. The wheel support bracket as shown in FIGS. 2–4 is in the form of a yoke having spaced side members 35 and 36 and a connecting web portion 37. The caster wheel or wheels 15 are rotatably mounted adjacent the lower end of yoke as by a pin or axle 38, and the wheel support bracket is pivotally mounted adjacent at the forward end by a pivot pin 41 on the side walls 26 of the caster bracket. The wheel support bracket and caster wheel 15 are yieldably urged downwardly as by a spring or springs 42 herein shown interposed between the yoke 37 on the support bracket and the rear wall 27 of the housing, and a stop means is advantageously provided to limit swinging movement of the support bracket. As shown, one of the side members 36 of the wheel support bracket has a portion 36a formed with an elongated opening 44 to receive a stop pin 45 attached to the side wall 26 of the housing. The wheel support bracket is thus yieldably movable relative to the caster bracket to provide limited vertical movement of the wheel 15 between the positions shown in FIGS. 2 and 3.

The brake means 18 is arranged to operate between the stationary mounting bracket 21 and the caster bracket 22, to inhibit swiveling of the caster wheel relative to its mounting bracket. The brake means is automatically operated to provide a variable braking action in accordance with the vertical position of the ground engaging caster wheel 15 to increase the braking action when the wheel moves out of engagement with the ground. For this purpose, the mounting bracket 21 has an annular braking surface on the underside thereof concentric with the pivot axis and conveniently in the form a smooth surface on the mounting plate. A brake member 51, best shown in FIG. 5, is mounted on the caster bracket 22 in a position to engage the annular braking surface 21a. As shown, the brake member 51 is slidably supported in a passageway 25a in the top wall 25 of the caster bracket and conveniently has a brake facing 51a on the side thereof that engages, the braking surface 21a. Variable braking action is provided by a cam movable with one wheel support bracket. As shown, the cam includes a lobe portion 53a and a dwell portion 53b conveniently formed on one of the side members 36 of the wheel support bracket. A cam follower 54 engages the cam and actuates the brake member 51 to provide the variable braking action. In the form shown, the cam follower 54 is formed separate from the brake member and a spring 56 is interposed between the cam follower and the brake member to normally yieldably urge the same apart. The swivel dampening brake is preferably arranged to provide a high braking action when the caster wheel moves out of engagement with the ground to substantially lock the caster wheel against swiveling under these conditions, and to provide a relatively light braking action when the caster wheel is in its normal ground engaging position, to permit relatively free swiveling. In the preferred embodiment shown, the spring 56 is a lightweight spring to normally apply only a relatively light braking pressure to the brake member when the spring is compressed and provision is made to establish a substantially rigid connection between the cam follower member and the brake member, when the cam lobe 53a actuates the cam follower, to thereby directly press the brake member against the braking surface 21a. For this purpose, a plunger 54a is interposed between the cam follower 54 and the brake member 51. The plunger is conveniently formed integrally with one of the members such as the cam follower member 51, and guidably extends into a socket 51b in the brake member. As shown in FIG. 5, the plunger is arranged to engage the bottom of the socket 51b when the cam lobe 53a engages the cam follower, to directly force the brake member against the cam surface. When the cam follower rides in the dwell portion 53b, the spring 56 urges the end of the plunger away from the bottom of the socket so that the brake is then pressed against the braking surface only by the spring 56. This arrangement provides a relatively sharp braking action when the lobe 53a engages the cam follower, to substantially lock the caster against swiveling movement under these conditions. However, when the caster wheel engages the ground as shown in FIG. 3, the lobe moves out of engagement with the cam follower so that the brake member is pressed against the braking surface with a relatively light pressure controlled by the spring 56. If problems are encountered with "shimmy" of the caster unit while the caster wheel is running in engagement with the ground, the spring 56 can be selected so as to apply a moderate braking pressure sufficient to inhibit shimmy under these conditions. The braking pressure would, of course, be increased markedly when the cam lobe 53a engaged the cam follower and caused the plunger 45a to directly press the brake member against the braking surface 21a. While the cam in its preferred form is shown with an elongated dwell portion and a relatively sharp lobe 53a, to provide a sharp increase in the braking action as the wheel moves into its lowermost position, it is to be understood that the cam could be otherwise formed as with a progressive taper to progressively increase the braking action, if desired for certain installations. Moreover, while a plunger 54a is herein shown provided to directly apply braking pressure from the cam follower to the brake member, when the wheel approaches its lowermost position, it is to be understood that a resilient member of somewhat greater strength could be used to transmit force from the cam follower to the braking member. Such an ararngement would not provide the sharp increase and decrease in braking action achieved by the apparatus illustrated, as the wheel moves to its lowermost position, but may be sufficient for some installations where the preferred operating characteristics are not required.

What is claimed as new is:

1. In a caster apparatus including a stationary mounting bracket adapted to be rigidly secured to a body, a caster bracket swivelling mounted on the mounting bracket for movement relative thereto about a generally upright caster axis, a ground engaging wheel, and means rotatably mounting the ground engaging wheel on the caster bracket for rotation about a generally horizontal axis, the improvement comprising brake means operable between said caster bracket and said stationary mounting bracket to inhibit swiveling movement of the caster bracket relative to the mounting bracket, and brake actuating means for operating said brake means to decrease and increase the braking action respectively in response to engagement and disengagement of the wheel with the ground to thereby inhibit swiveling of the caster bracket when the wheel is out of engagement with the ground while allowing relatively free swiveling action when the wheel is in engagement with the ground.

2. In a caster apparatus including a stationary mounting bracket adapted to be rigidly secured to a body, a ground engaging wheel, and wheel support bracket means mounting the wheel on the mounting bracket for swiveling movement relative to the mounting bracket about a generally upright axis and for limited vertical movement relative to the mounting bracket, the improvement comprising brake means operable between the wheel support bracket means and the stationary mounting bracket for inhibiting swiveling movement about said generally upright axis, and brake actuating means responsive to vertical movement of the wheel relative to the mounting bracket for operating said brake means to increase and decrease the braking action respectively as the wheel moves downwardly and upwardly relative to the mounting bracket.

3. In a caster apparatus including a stationary mounting bracket adapted to be rigidly secured to a body, a caster bracket swivelling mounted on the mounting bracket for movement relative thereto about a generally upright axis, a wheel support bracket pivotally mounted on said caster bracket for limited vertical swinging movement relative thereto, a ground engaging wheel rotatably mounted on said wheel support bracket, yieldable means engaging said wheel support bracket yieldably urging the wheel support bracket in a downwardly direction, the improvement comprising a swivel dampening brake operable between said caster bracket and said stationary mounting bracket to inhibit swiveling movement of the caster bracket, and brake actuating means responsive to movement of the wheel support bracket relative to the caster bracket to increase the braking action as the wheel support bracket moves toward a selected lower position to thereby inhibit swiveling of the caster bracket as the wheel moves out of engagement with the ground.

4. A caster apparatus according to claim 3 wherein said brake actuating means includes a cam on said wheel support bracket and cam follower means engaging said cam and operatively connected to said brake means.

5. A caster apparatus according to claim 3 wherein said brake means includes an annular brake surface at the underside of said mounting bracket, a brake member mounted on said caster bracket and engageable with said brake surface, and said brake actuating means includes a cam on said wheel support bracket and cam follower member on said caster bracket engageable with said cam and operatively connected to said brake member.

6. A caster bracket according to claim 5 wherein said caster bracket has a passage therein slidably supporting said brake member and said cam follower member, and spring means interposed between said brake member and said follower member yieldably urging the brake member into engagement with the brake surface and the cam follower member into engagement with the brake surface and the cam follower member into engagement with the cam.

7. A caster bracket according to claim 6 wherein the cam follower member and brake member have rigid portions normally spaced apart in a direction axially of said passage and adapted to engage when the cam means reaches a preselected position to thereby positively press the brake member against the brake surface.

8. A caster bracket according to claim 6 wherein one of the items comprising the brake member and the cam follower member has a plunger thereon and the other of the items having a socket guidably receiving the plunger, the end of the plunger being normally spaced from the base of the socket and adapted to engage the base of the socket when the cam means reaches a preselected position to thereby positively press the brake member against the brake surface.

9. A caster bracket according to claim 8 wherein said spring means comprises a coil spring disposed around said plunger.

10. In a shock absorbing caster apparatus, a stationary mounting bracket adapted to be rigidly secured to a body, a caster housing open at the rear thereof and including a top wall, depending side walls and a rear wall joined to the side and top walls, means swivelly mounting the top wall of the caster housing on the mounting bracket, a wheel support yoke including spaced side members and a connecting web at the forward portions thereof extending into the open rear side of the caster housing, means pivotally mounting the forward portions of the side members of the yoke on the side walls of the housing, a wheel rotatably mounted between the side members of the yoke adjacent the rear portions thereof, and spring means disposed between the rear wall of the housing and web of the yoke yieldably urging the yoke in a direction to press the wheel downwardly, the improvement comprising a passage in said top wall spaced from the swivel axis of the caster housing, said mounting bracket having an annular braking surface registering with said passage, a brake member slidable in said passage and engageble with said brake surface, cam means on said yoke and cam follower means engageable with said cam means for applying braking pressure to said brake member when the wheel moves downwardly relative to the mounting bracket to a preselected position to inhibit swiveling of the caster housing relative to the mounting bracket.

References Cited

UNITED STATES PATENTS

| 2,738,542 | 3/1956 | Clark | 16—44 |
| 2,962,126 | 11/1960 | Legge | 16—35 |

BOBBY R. GAY, Primary Examiner

D. L. TROUTMAN, Assistant Examiner

U.S. Cl. X.R.

188—1